April 28, 1970  R. L. PERL  3,509,319
COUNTER TOP COOKING APPLIANCE

Filed March 5, 1968  2 Sheets-Sheet 1

INVENTOR
RICHARD L. PERL

BY
Oberlin, Maky, Donnelly & Renner
ATTORNEYS

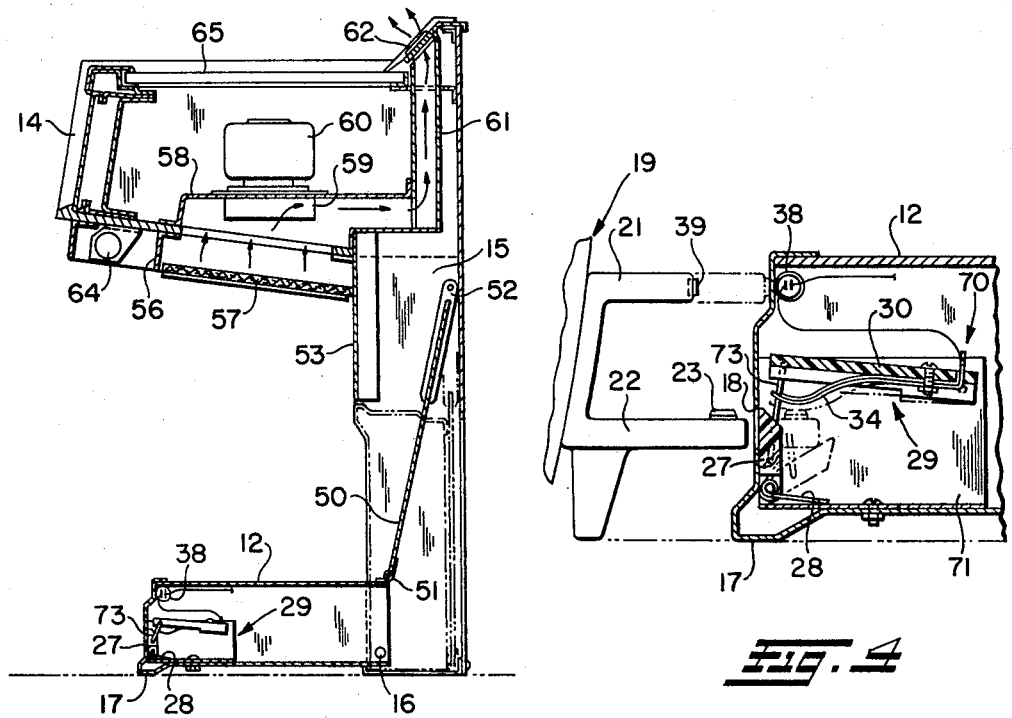
Fig. 3
Fig. 4
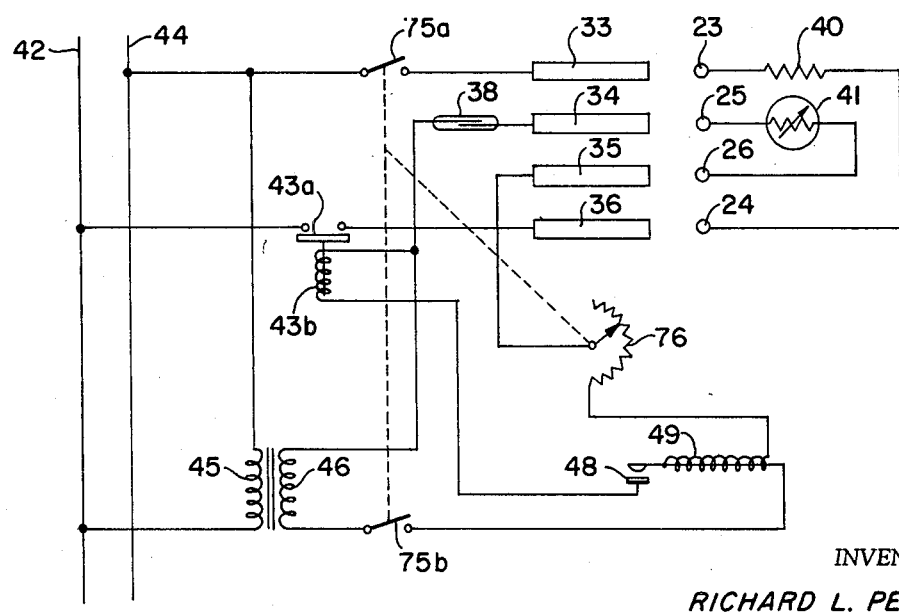
Fig. 5
INVENTOR
RICHARD L. PERL
BY
Oberlin, Maky, Donnelly & Renner
ATTORNEYS

United States Patent Office 3,509,319
Patented Apr. 28, 1970

3,509,319
COUNTER TOP COOKING APPLIANCE
Richard L. Perl, Mansfield, Ohio, assignor to The Tappan Company, Mansfield, Ohio, a corporation of Ohio
Filed Mar. 5, 1968, Ser. No. 710,525
Int. Cl. H05b 3/68
U.S. Cl. 219—432   3 Claims

ABSTRACT OF THE DISCLOSURE

An appliance of inverted L-shape to rest on a kitchen counter, with the upper part projecting forwardly as a shelf and a pivoted terminal box stored upright within the vertical section and swinging out to a horizontal working position on the counter. The terminal box has front sockets into which portable electrically heated vessels are plugged, the vessels having plug handle parts and carrying magnets which operate magnetic safety switches in the terminal box when the vessels are plugged in as a requirement for socket energization. The upper section includes a blower and filter for venting the counter area beneath the same.

---

Figure 1:
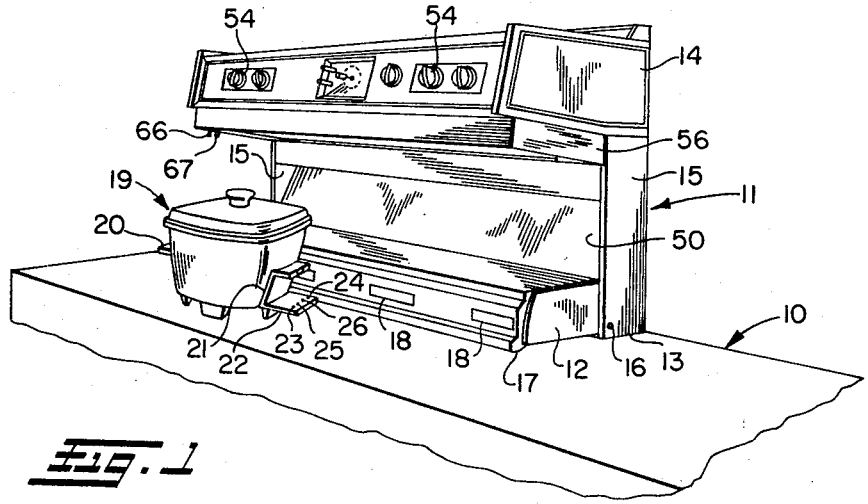

This invention relates, as indicated, to an appliance for cooking or preparing foods on a kitchen counter and the like and, more particularly, to such an appliance in which the foods are heated in portable electrically heated vessels.

A combination of plural self-heating vessels and a common control section can afford a housewife conveniently all of the operations normally performed by use of the exposed surface heating elements of conventional ranges and cook tops, as shown by U.S. Patent No. 3,140,388 wherein such an assembly is disclosed as incorporated in a high oven range construction and also alternatively in a free-standing range. The high oven range embodiment of the patent is intended to be hung on a wall or supported on a separate base cabinet and includes a shelf for support of the portable vessels in use, the vessels having electrical contacts in handles of the same which plug into sockets of the control section. The same type of vessel and socket configuration is employed in the second range form as well, only in this case the control section is in the back-splasher of the range and the top of the latter which would normally contain the surface elements is smooth for the vessel support.

The present invention is directed to provision of a new appliance which is basically a comparable combination of such plural heated vessels and a control section, but without included oven structure and otherwise of improved form and arrangement especially suited for counter top installation.

The type of vessel and socket interconnection shown in the aforesaid patent is preferred in the new appliance as well for the same reasons, namely, to permit the vessels to be styled and of such attractive design that they can be used in the serving as well as in the preparation of the food, and to make the connection and disconnection with the controls extremely simple and easily accomplished. As also noted in the patent, it is desirable that the socket be normally de-energized and the current supply to the same interlocked to vessel insertion as a safety feature, and it is another object of the present invention to provide a different form of such interlock with even greater protection against accidental socket energization and consequent shock hazard.

With respect particularly to the form of the vessel and socket employed and the configuration for the control section, the present improvements are in contrast to the counter top unit approach disclosed in U.S. Patent No. 3,056,013. This further patent shows a control console placed on the counter and having a plurality of specially designed switch and thermostat units for vessel connection mounted in and projecting at the lower front region. The special terminal units are two-connector female sockets with thin thermostat probes extending appreciably from the end faces of the sockets; the vessel connection in this assembly must provide the usual two exposed prongs, as well as a special socket to receive the probe, and the configuration is typically unsightly. A modification of the patent assembly is proposed to retract, either by a drive motor or manually, these special terminals fully within the console, but the base width of the latter remains the same and such retraction only removes the unusual further intrusion of the counter space by the probes.

It is a further object of the present invention to provide such a counter top appliance having a control section for the vessels which is adjustable between operative and non-operative positions and, in the second position, occupies only a relatively small part of the kitchen counter space at the location of the appliance.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
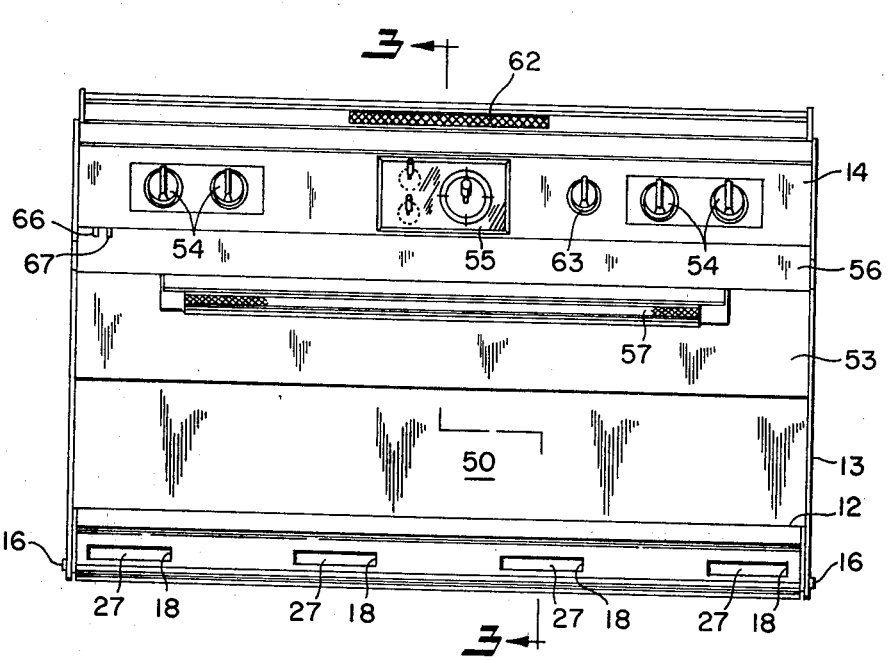

In said annexed drawings:
FIG. 1 is a perspective view of a counter top cooking appliance in accordance with the present invention;
FIG. 2 is a front elevation of the appliance;
FIG. 3 is a transverse sectional view at the line 3—3 in FIG. 2;
FIG. 4 is a fragmented enlarged section of the vessel and socket connection used in the appliance; and
FIG. 5 is a simplified wiring diagram for one vessel and socket combination.

Referring now to the drawings in detail, reference numeral 10 designates a counter or other equivalent work surface in a kitchen on which the new and of course separately formed appliance designated generally by reference numeral 11 is supported along the back edge and preferably against a wall for anchoring in any suitable manner.

The structure comprises a hollow base section 12, a relatively thin vertical section 13 open at the front, and an upper shelf section 14, the latter also being of hollow or cabinet form. As shown most clearly in FIG. 3, the base section 12 is connected at its lower rear corners to the side walls 15 of the vertical section by pivots 16 for adjustment between horizontal and vertical positions. In the horizontal position, the base rests at its forward edge 17 on the counter, with this being the position for use of the section as will be further described below, the vertical position providing storage during non-use. The storage position is indicated in FIG. 3 by the dashed lines and it is preferred that the normal bottom of the base be in this condition substantially flush with and closing the front of the vertical section.

When the base 12 is in this storage position, only the minor area of the counter beneath the vertical section 13 is obscured and, in the illustrated design, this area is about a third of the total counter area used with the base section down or in the horizontal working position. The bottom of this base is preferably also of finished appearance and can be decorated further to enhance the over-all esthetic appearance of the unit.

3

This adjustable base section has four rectangular apertures 18 in its front wall and, respectively behind these are electric circuit terminals and connections for portable electrically heated vessels such as the one illustrated in FIG. 1 and designated generally by reference numeral 19. As noted in the foregoing, it is intended that such vessel be styled so that it can attractively be used in serving the food cooked in the same, and, although the design can vary widely, it is significant that a terminal member be provided which does not detract from the appearance. The vessel 19 is shown as having a simple handle 20 at one side and a further handle piece 21 at the opposed side which includes a special lower "plug" section 22. This plug is a rectangular projection dimensioned for insertion in one of the base apertures or sockets 18, as shown by the dashed outline in FIG. 4, with this insertion accomplished simply by sliding the vessel against the front of the base section while resting on the counter.

The electric heating element of the vessel, incorporated in any known manner, is internally connected at its ends to two contacts 23, 24 exposed at the top of the plug section 22, and the vessel is preferably also equipped with a temperature sensing resistor having internal connections to two additional contacts 25, 26 of the plug.

Behind each aperture 18 at the front wall of the base is located a terminal block module 70 which comprises a short section of U-shaped channel 71 retained in position by mounting screws located in the bottom of the channel. Each module 70 is provided with a bottom hinged door 27 which is normally held closed by a small spring 28 and is swung open by the plug 22 as it is inserted. Within each module 70 is further located the circuit terminal device, designated generally by reference numeral 29 which consists of an insulative plate 30 pivotally mounted at the rearward and upper portion of the channel 71 and normally extending forward toward the aperture 18. Connecting links 73 consisting of short lengths of rigid rod pivotally join the door 27 and the plate 30, at the sides thereof, in a manner such that when the plug 22 is inserted into the module 70, as shown in dashed lines in FIG. 4, the door 27 will be swung backwardly and the plate 30 will be drawn downwardly at its forward portion by means of the links 73. Four leaf-type conductor strips 33-36 are mounted by bolts in aligned recesses in the plate 30, the strips 33-36 being engaged by the four contacts 23-26 on the vessel plug 22 to complete electrical circuits. The inward insertion of the plug 22 provides a wiping action against the conductor strips 33-36 to assure a good electrical contact and the downward swing of the plate 30 adds to the firmness of the contact. It is to be noted that in the closed position, the door 27 effectively seals the aperture 18 against accidental entry of foreign objects.

A magnetic reed switch 38 is also provided at each socket above the same and behind a section of the base front wall opposed to the upper section of the vessel handle piece 21. This handle section carries a small permanent magnet 39 in its outer face operative to close the reed switch, which is normally open, when the vessel plug is fully inserted, and this closure is used as an interlock for the supply of current to the socket terminal unit 29.

In the wiring diagram of FIG. 5, the resistance 40 represents the heating element of the vessel and the resistance 40 represents the heating element of the vessel and the resistance 41, the temperature sensing element in the same, with the former connected as previously noted to the plug contacts 23, 24 and the latter to the further contacts 25, 26 of the plug. The circuit for energizing the vessel heating element 40 consists of a power portion and a control portion for regulating the temperature of the vessel with the magnetic safety switch 38 connected in the latter circuit. In the power circiut one end of the element 40 is connected by way of the contact made between plug contact 23 and conductor strip 33 and one contact 75a of a power switch to a first energy supply conductor 44 and the other end of the element 40 is connected by way of the plug-strip contact 24, 36 and the normally open contacts 43a of a relay to the second supply conductor 42. Thus, when the plug 22 of the vessel is inserted into the terminal switch module 70 to individually join contacts 23-26 with conductor strips 33-36, the power circuit for supplying energy to the heating element 40 will be operable upon the manual closure of power switch contacts 75a and the automatic closure of relay contacts 43a. Operation of relay contact 43a is provided by the control circuit which serves to connect or disconnect the vessel element 40 from the power source to regulate the temperature thereof.

In the control circuit, the primary winding 45 of a step-down transformer is shown connected to supply conductors 42, 44. The secondary winding 46 of the transformer supplies a low voltage of approxiamtely twelve volts for control purposes. A circuit connected across the secondary winding 46 of the transformer comprises, in series, the magnetic safety switch 38, the plug-strip contact 34, 25, the sensing reesistor 41, the plug-strip contact 26, 35, a rheostat 76, the coil 49 of a bimetal switch and a second contact 75b of the power switch. The first and second contacts 75a, 75b of the power switch and the rheostat 76 are conveniently joined as a single unit as indicated by dashed lines and are operable by a control knob 54 located at the front of the upper shelf section 14. Initial rotation of the knob 54 will cause closure of the contacts 75a, 75b and further rotation will effect an adjustment of the rheostat 76 to a desired resistance setting. The remainder of the control portion of the circuit includes the coil 43b of the relay, energizable to open or close contact 43a, connected across the secondary winding 46 of the transformer in series with contacts 48 of the bimetal switch, the bimetal leaf itself and the second contacts 75b of the power switch.

In an alternative configuration for the control circuit, the control knob 54 could be utilized to effect a variable separation of bimetal switch contacts 48, rather than setting the rheostat 76, thereby to adjust the drop out point of contacts 48 and thus the temperature level of the element 40.

Typical operation of the control circuit will occur as follows upon insertion of the plug 22 into the terminal block module 70 and the closure of the power switch. Provided the magnetic switch 38 has been closed by the proximity of the permanent magnet 39 on the handle piece 21, current will flow through the sensing resistor 41, the rheostat 76 and the coil 49 of the bimetal switch to cause bending of the bimetal leaf and closure of the contact 48 of the bimetal switch, thereby causing energization of relay coil 43b, and closure of relay contacts 43a to energize the cooking element 40. The bimetal switch, operative on a temperature responsive basis, may be considered as operative to maintain contacts 48 open below a predetermined level of current flow through coil 49 and to close the contacts 48 above this level of current flow. Sensing resistor 41 is a heat responsive device having a positive temperature coefficient of resistance and cooperates with the setting of the rheostat 76 to limit current flow in the control circuit.

Thus, for a particular setting of the rheostat 76 and upon initial closure of the power switch contacts 75a, 75b, the sensing resistor 41 will have a low resistance and allow a relatively high current flow to energize the bimetal switch and thus, the relay contacts 43a. As the resistor 41 is elevated in temperature by the heat from the cooking element 40, the resistance of sensor 41 will increase to a point where the combined resistance of the sensor 41 and the rheostat 76 will limit current flow to cause drop out of the bimetal switch contacts 48 and thus, a deenergization of relay coil 43b to remove the heating element 40 from the supply conductors 42, 44. This cycling will recur about a temperature level dependent upon the setting of the rheostat 76 and it is clear that in the absence of closure of magnetic switch 38 no cycling will occur. Further, it is to be noted that even if a foreign object were inserted in aperture 18 to contact the conductor strips 33–36, failure of closure of magnetic switch 38 will prevent the presence of dangerous high potential voltages at this location.

It will of course be understood that the appliance serves a plurality of vessels which can be of varying size and design, with the illustrated unit accommodating four in operation at the same time, and all of the sockets and circuits therefor are of the form and arrangement described in the above.

The vertical section 13 of the appliance also accommodates a metal shield plate 50 coextensive with the base section 12 and hinged thereto at the rear upper corner of the same as shown at 51. The opposed edge portion of the plate is guidably restrained in slotted arms 52 pivoted to the side walls 15 of the vertical section at the inner upper regions of the same. Again as shown in FIG. 3, the plate 50 extends when the base section is in its horizontal position from the top rear of the same at an inclination toward the rear wall of the section 13 and above the lower edge of the partial front wall 53 of this section. The plate has a finished forward surface and accordingly thus acts as a decorative screen for the section opening when the base is extended. The noted mounting of the plate, slidable in the pivot arms 52, permits it to move to a vertical position behind the base section when the latter is in its storage position shown by the dashed outline of the same.

The upper shelf section 14 of the appliance has an appreciable forward projection and houses the adjustable temperature controllers for the several sockets 18, including knobs 54 accessible at the front of the shelf. The latter is also shown as including a clock 55 and obviously additional controls and accesories may be accommodated if desired. The underside of the shelf is formed with a plenum chamber 56 having an open bottom in which an air filter 57 is disposed. This chamber leads to internal ducting in one section 58 of which there is a blower 59 driven by an electric motor 60 to draw air in through the filter and through a further duct section 61 to a screened outlet 62 at the back of the top portion of the shelf section. The blower, under control of a switch 63 at the shelf front, is thus operative to remove and filter vapors and the like generated in the use of the cooking vessel or vessels.

A fluorescent light 64 is also applied to the underside of the shelf section adjacent the front edge for convenient illumination of the working area, and the top of the shelf section is preferably an electrically heated glass panel 65 of known form separately controlled by a push-button switch 66 shown located at the front left corner region next to a second push-button switch 67 which controls the fluorescent light. This heated shelf panel serves as a warmer and a further aid in preparing the food.

It will thus be seen that the new appliance provides a very efficiently organized and attractive unit which can readily be installed in any kitchen with minimal space requirement. Storage of a family of portable vessels on the order disclosed does not involve more than ordinary accommodation of pots and pans, and there is an actual savings of work areas as compared to a cook top with a comparable number of conventional surface elements.

Other modes of applying the principle of the invention may be employed, change being made as regards the details described, provided the features stated in any of the following claims or the equivalent of such be employed.

I, therefore, particularly point out and distinctly claim as my invention:

1. A counter top cooking appliance, comprising an enclosure of general inverted L-shape having a vertical section adapted to rest upon a kitchen counter at the rear edge of the same, said vertical section being of open front cabinet form and having a depth which is small relative to its width and height, a hollow base section stored in an upright position within said vertical section, means pivoting the upright base section to the vertical section at the bottom for swinging movement outward to rest upon the counter in a horizontal working position, electric socket means within the base section at an access opening which is at the front in the working position for connection of an electrically heated vessel thereto, the enclosure further having a forwardly projecting upper horizontal section the height of which is small relative to the width and depth of the same, a settable control for the socket means located at the front of said upper section, the overall height of the enclosure being such that the top surface of the upper section serves as a shelf at a conveniently assessible spacing above the kitchen counter, circuit means for energizing the socket means through said control, and interlock switch means for closing the circuit means in response to connection of a vessel to the socket means.

2. The combination set forth in claim 1, wherein said interlock means is a magnetic switch, and the vessels carry magnets for closing the same upon insertion in the socket connector.

3. The combination set forth in claim 1, wherein the upper section of the enclosure contains vent means including a blower and a filter for withdrawing and filtering air from the area beneath the same.

References Cited

UNITED STATES PATENTS

| 2,931,873 | 4/1960 | Lang | 219—444 |
| 3,012,116 | 12/1961 | Boylan | 335—205 |
| 3,140,388 | 7/1964 | Perl | 219—435 |

JOSEPH V. TRUHE, Primary Examiner

M. C. FLIESLER, Assistant Examiner

U.S. Cl. X.R.
219—435, 444